US011433862B2

(12) United States Patent
Eigel et al.

(10) Patent No.: US 11,433,862 B2
(45) Date of Patent: Sep. 6, 2022

(54) DRIVER ASSISTANCE SYSTEM FOR A TRANSPORTATION VEHICLE, TRANSPORTATION VEHICLE, AND METHOD FOR OPERATING A DRIVER ASSISTANCE SYSTEM OR TRANSPORTATION VEHICLE (71) Applicant: VOLKSWAGEN AKTIENGESELLSCHAFT, Wolfsburg (DE)

(72) Inventors: Thomas Eigel, Berlin (DE); Sebastian Busch, Braunschweig (DE)

(73) Assignee: Volkswagen Aktiengesellschaft

( * ) Notice: Subject to any disclaimer, the term of this patent is extended or adjusted under 35 U.S.C. 154(b) by 391 days.

(21) Appl. No.: 16/656,126

(22) Filed: Oct. 17, 2019

(65) Prior Publication Data
US 2020/0122694 A1 Apr. 23, 2020

(30) Foreign Application Priority Data
Oct. 23, 2018 (DE) ...................... 10 2018 218 099.7

(51) Int. Cl.
*B60T 7/22* (2006.01)
*B60W 10/18* (2012.01)
(Continued)

(52) U.S. Cl.
CPC ............. *B60T 7/22* (2013.01); *B60W 10/18* (2013.01); *B60W 50/14* (2013.01); *G06V 20/58* (2022.01);
(Continued)

(58) Field of Classification Search
CPC .. B60T 7/22; B60T 2201/022; B60T 8/17558; B60T 2201/03; B60W 10/18;
(Continued)

(56) References Cited

U.S. PATENT DOCUMENTS

2006/0060432 A1* 3/2006 Schog ................... F16D 65/092
188/73.39
2008/0167781 A1 7/2008 Labuhn et al.
(Continued)

FOREIGN PATENT DOCUMENTS

DE 102004058037 A1 7/2005
DE 102008056204 A1 5/2010
(Continued)

*Primary Examiner* — Frederick M Brushaber
(74) *Attorney, Agent, or Firm* — Barnes & Thornburg, LLP (57) ABSTRACT A driving assistance system for a transportation vehicle, a corresponding transportation vehicle, and a corresponding operating method. The driving assistance system for supporting the longitudinal control of the transportation vehicle identifies an obstacle ahead of the transportation vehicle based on environment data. According to a first functionality, the driving assistance system causes emergency braking to bring the transportation vehicle to a standstill to avoid a collision. According to a second functionality, the driving assistance system causes a longitudinal control intervention that is reduced compared to the emergency braking to slow down the transportation vehicle once the obstacle is detected and before the transportation vehicle has approached the obstacle to such an extent that the collision is only prevented by emergency braking.

15 Claims, 2 Drawing Sheets (51) Int. Cl.
    *B60W 50/14*          (2020.01)
    *G06V 20/58*          (2022.01)
    *B60W 50/00*          (2006.01)
    *B60T 8/1755*         (2006.01)
    *B60W 30/09*          (2012.01)
    *B60W 30/18*          (2012.01)

(52) U.S. Cl.
    CPC . *B60W 2050/0072* (2013.01); *B60W 2554/00* (2020.02)

(58) Field of Classification Search
    CPC ......... B60W 50/14; B60W 2050/0072; B60W 2554/00; B60W 2520/105; B60W 2710/10; B60W 30/09; B60W 30/18154; B60W 50/0098; G06V 20/58
    See application file for complete search history.

(56) References Cited

U.S. PATENT DOCUMENTS

| | | | |
|---|---|---|---|
| 2017/0113667 A1* | 4/2017 | Kim | B60T 7/22 |
| 2017/0129488 A1* | 5/2017 | Noumura | B60W 10/18 |
| 2018/0151075 A1* | 5/2018 | Claesson | B60W 30/09 |
| 2018/0229705 A1* | 8/2018 | Farres | B60T 8/172 |

FOREIGN PATENT DOCUMENTS

| | | |
|---|---|---|
| DE | 102010021591 A1 | 12/2011 |
| DE | 112006002248 B4 | 4/2014 |
| DE | 102013202463 A1 | 8/2014 |
| DE | 112015003634 T5 | 4/2017 |
| DE | 102016212700 A1 | 1/2018 |

\* cited by examiner

DRIVER ASSISTANCE SYSTEM FOR A TRANSPORTATION VEHICLE, TRANSPORTATION VEHICLE, AND METHOD FOR OPERATING A DRIVER ASSISTANCE SYSTEM OR TRANSPORTATION VEHICLE

PRIORITY CLAIM

This patent application claims priority to German Patent Application No. 10 2018 218 099.7, filed 23 Oct. 2018, the disclosure of which is incorporated herein by reference in its entirety.

SUMMARY

Illustrative embodiments relate to a driving assistance system for a transportation vehicle, a corresponding transportation vehicle with such a driving assistance system and a method for operating such a driving assistance system and/or transportation vehicle.

BRIEF DESCRIPTION OF THE DRAWINGS

An exemplary embodiment is described below. To this end, in the figures.

DETAILED DESCRIPTION

Today many different driving assistance systems for transportation vehicles are already known that can assist a driver of the respective transportation vehicle in driving the transportation vehicle or can at least partially drive the transportation vehicle automatically. An example of this is a braking assistant or a collision avoidance system, which, in emergency situations, causes the transportation vehicle to stop as quickly as possible by automatic braking intervention to avoid a collision with a detected obstacle or to mitigate a collision with a detected obstacle as far as possible. Corresponding emergency braking interventions of such systems are typically limited to acute hazardous situations, in which strong and correspondingly uncomfortable automatic interventions in the longitudinal and/or lateral control of the transportation vehicle are accepted. However, such systems are neither error-free, i.e., they are not always absolutely reliable in the detection of obstacles justifying or making necessary emergency braking with maximum strength, nor are they suitable for all traffic situations.

DE 10 2004 058 037 B4 describes a driving support device for preventing a transportation vehicle collision. In this case, existing targets ahead of the transportation vehicle are detected and a processor supports driving the transportation vehicle to stop the transportation vehicle in a safe position. In view of the fact that incorrectly detected objects may result in a braking operation that is not in line with the intention of the driver, it is provided that the processor only stops the transportation vehicle in a case in which a plurality of targets are ahead of the transportation vehicle and these targets are of the same type.

From DE 11 2015 003 634 T5, a display device for a transportation vehicle is known that displays various information in connection with the movement of a transportation vehicle for a viewer within a display area. An outer circumference of a corresponding display is formed by a ring section, which is visually perceived as a virtual image within the display area. The display device comprises a motion mechanism that is able to move a position of the ring section. For example, a transportation vehicle equipped accordingly may comprise a camera for detecting an environment. By the display device, a warning can then be displayed to an approaching transportation vehicle, for example.

Disclosed embodiments increase road safety in a particularly comfortable way.

A disclosed driving assistance system for a transportation vehicle is used to support a driver of the transportation vehicle in the longitudinal control of the transportation vehicle. The disclosed driving assistance system is set up to detect an obstacle in the direction of travel ahead of the transportation vehicle on the basis of environment data provided by an environment sensor arrangement. The environment sensor arrangement can be part of the driving assistance system itself. Likewise, the environment sensor arrangement can be part of the transportation vehicle, wherein the driving assistance system can then comprise a corresponding data interface, via which the environment data provided by the sensor arrangement can be transmitted or received. The environment sensor arrangement and the driving assistance system may be connected or coupled to each other directly or, for example, via an on-board network of the transportation vehicle. The environment sensor arrangement can be or can include one or more sensors, such as a camera, a radar device, a LIDAR device or an ultrasonic device, a laser scanner and/or the like. The environment data thus characterize a current environment of the transportation vehicle. The disclosed driving assistance system is further equipped to initiate an emergency braking intervention according to a first functionality to stop the transportation vehicle to avoid an otherwise imminent collision with the detected obstacle. An emergency braking intervention in this sense may be an automatic intervention in the longitudinal control of the transportation vehicle, by which a maximum possible or achievable deceleration of the transportation vehicle is implemented. For this purpose, the driving assistance system can, for example, transmit a corresponding control command to a braking system of the transportation vehicle, which then applies a technically maximum possible braking force. This first functionality of the driving assistance system thus serves to avoid or mitigate the collision of the transportation vehicle with the detected obstacle in an acute danger situation. In doing so, the limited comfort for the driver of the transportation vehicle or other occupants of the transportation vehicle caused by a maximum braking deceleration during the emergency braking operation will be prioritized to a lower degree than avoiding or attenuating the collision and will therefore be accepted. Emergency braking is therefore an emergency measure that is used as a last resort to avoid or mitigate the collision and is therefore generally not suitable for less dangerous situations occurring in the normal driving mode.

According to the disclosed embodiments, the driving assistance system is also equipped to induce, according to a second functionality, a longitudinal control intervention that is reduced compared to the emergency braking intervention, to slow down the transportation vehicle as soon as the obstacle is detected and before the transportation vehicle has approached the identified obstacle to such an extent that the collision can only be prevented by emergency braking. In other words, it is envisaged that, when approaching the identified obstacle, the transportation vehicle should be slowed down or decelerated by the reduced longitudinal control intervention earlier than conventionally provided for at the start of emergency braking. The reduced longitudinal control intervention results in a lower or weaker deceleration, i.e., a braking acceleration or braking deceleration of smaller magnitude than for the emergency braking intervention or the emergency braking operation. This is possible without any danger, since at the time of or for a duration of the reduced longitudinal control intervention, a distance between the transportation vehicle and the identified obstacle is still large enough to prevent a collision by means other than the emergency braking intervention.

Due to the reduced longitudinal control intervention, the driver experiences an earlier and smaller or weaker braking acceleration, which means that occupant comfort or the ride comfort of the driver or the other occupants of the transportation vehicle will be less strongly affected than by the later but stronger emergency braking intervention. If the identified obstacle is another road user, such as a pedestrian or a cyclist or the like, the latter may be able to be signaled suitably early and comfortably regarding the reduced longitudinal control intervention, i.e., the relatively early deceleration of the transportation vehicle, that the transportation vehicle or the driving assistance system recognizes it, i.e., the obstacle, and has already correctly recognized and assessed the situation with regard to a possible risk of collision. This can achieve an overall improved traffic flow, since, for example, pedestrians or cyclists, who are thus signaled at an early stage that they have been recognized by the transportation vehicle or the driving assistance systems, often cross a road being travelled on by the transportation vehicle at an appropriately early stage, for example, and not only when the transportation vehicle has come to a complete standstill.

The reduced longitudinal control intervention contributes to improving road safety in several ways. On the one hand, the reduced longitudinal control intervention can serve as a hint to the driver to draw the attention of the driver to the fact that the driving assistance system has recognized or detected an obstacle or a risk of collision. Since this is done earlier than the emergency braking intervention, the driver then has sufficient time to use a driving maneuver to avoid the collision that can be supervised or controlled and that is less risky and more reliable than with the emergency braking intervention, for example, to bring the transportation vehicle to a standstill or to avoid the obstacle. The driver is less alarmed or distracted by the lower braking acceleration caused by the reduced longitudinal control intervention, so that he can respond faster, more reliably and more safely to each situation and can react in a manner appropriate to the situation.

If the obstacle or the corresponding risk of collision has been detected erroneously or incorrectly by the driving assistance system, only a significantly lower loss of comfort occurs with the reduced longitudinal control intervention than in the case of a false emergency braking intervention that is not really necessary. In this case, a safer reaction to avoid a collision with the transportation vehicle is also possible for other transportation vehicles that are following the transportation vehicle than would be the case with the execution of the emergency braking intervention.

Even if the driver does not act or does not react to the reduced longitudinal control intervention, for example, because he is distracted or is relying on control of the transportation vehicle by the driving assistance system, the reduced longitudinal control intervention improves safety, since when the transportation vehicle approaches closer to the obstacle, the speed of the transportation vehicle is already reduced by the reduced longitudinal control intervention and thus the initial situation for emergency braking is improved, so that there is a better chance of avoiding the collision and bringing the transportation vehicle to a safe stop.

The disclosure thus represents an improvement over conventional collision avoidance systems by providing a predictive comfort reaction, i.e., a predictive comfort intervention, such as the reduced longitudinal control intervention when obstacles are recognized. The driving assistance system may be set up to automatically switch from the second functionality to the first functionality if the transportation vehicle has approached the detected obstacle to such an extent that the emergency braking intervention is necessary to avoid the collision. In doing so, a relative spatial arrangement and speed between the transportation vehicle and the obstacle as well as a reaction of the driver can be automatically monitored by the driving assistance system, evaluated and taken into account for control or activation of the transportation vehicle.

An obstacle within the meaning of the present disclosure may be a physical obstacle, i.e., an object or another road user who is on or approaching a trajectory of the transportation vehicle. Similarly, in the light of the road traffic code, the obstacle can be understood as a point or area on the road or as a feature of road equipment at which the transportation vehicle is to be brought to a standstill. In this sense, for example, a light signal system standing on "red" or a stop sign or the like can be understood as an obstacle. Since other road users usually rely on the transportation vehicle to stop at such points or features, in the interests of road safety the emergency braking intervention and the reduced longitudinal control intervention can be justified and useful.

As described in connection with the emergency braking intervention, the reduced longitudinal control intervention can be caused by the driving assistance system, for example, by the driving assistance system transmitting a corresponding control command, for example, via an on-board network of the transportation vehicle, to the braking system and/or any other device of the transportation vehicle, such as an engine controller, a transmission controller, a fuel pump and/or the like.

In at least one disclosed embodiment, the driving assistance system is set up to cause the reduced longitudinal control intervention by causing a change of the transportation vehicle into an overrun mode to slow down the transportation vehicle by using the engine braking effect. In this context, the overrun mode or coasting mode in the usual sense means a driving condition of the transportation vehicle in which, in the case in which traction is not disconnected, a drive engine is driven by the transportation vehicle, i.e., is maintained in rotation by the movement of the transportation vehicle. In other words, in the case of the reduced longitudinal control intervention, here activating or operating a dedicated braking system of the transportation vehicle may be dispensed with. By a change into the coasting mode, the reduced longitudinal control intervention can be designed or realized to be particularly comfortable and energy-saving. For example, in many transportation vehicles today, interruption of a fuel supply in overrun mode is provided by a thrust shutdown. In the case of electric or hybrid transportation vehicles, recuperation can be carried out in overrun mode for the recovery of electrical energy. Depending on the design of the transportation vehicle, the overrun mode may be accompanied by or connected with a characteristic noise background, which can be distinguished from a noise background of the transportation vehicle, i.e., an operating noise, during regular driving as well as when rolling or braking with traction disconnected, i.e., with the clutch actuated or disconnected, for example. This can act as an additional indication for the driver, so that he can be particularly reliably informed of the situation, i.e., of the obstacle recognized by the driving assistance system.

In a further disclosed embodiment, the driving assistance system is set up to use not more than 25% of a maximum braking power of the transportation vehicle for the reduced control intervention. The maximum braking power corresponds to a technically maximum braking force applied by a braking system of the transportation vehicle. This maximum braking power may be a braking power intended for emergency braking. For the reduced longitudinal control intervention, the braking system may therefore apply or use a maximum of one quarter of the maximum braking force provided for in accordance with the specification. Similarly, however, the braking power can be generated by other measures. For example, a braking power or braking effect of the engine effected in overrun mode may also be less than 25% of the maximum braking power and therefore can also be used consistently in this disclosed embodiment for the reduced longitudinal control intervention. The respective actual applied or acting braking power can be determined automatically by the driving assistance system on the basis of corresponding data of the respective operating equipment, i.e., for example, the braking system of the transportation vehicle. Similarly, the driving assistance system can detect and take into account acceleration values of the transportation vehicle provided by an accelerometer to determine the braking power with which the transportation vehicle is currently being decelerated. Depending on the braking power or the actual braking deceleration or acceleration of the transportation vehicle determined by the driving assistance system, the driving assistance system can then automatically adapt a control instruction issued to bring about the reduced longitudinal control intervention to ensure that the actual applied or used braking power during the reduced longitudinal control intervention reaches not more than 25% of the maximum braking power or correspondingly an actual braking acceleration of the transportation vehicle during the reduced longitudinal control intervention corresponds to no more than 25% of a maximum specified braking acceleration of the transportation vehicle in the event of emergency braking or full braking. By such a limitation of the braking power or braking acceleration used for the reduced longitudinal control intervention, it can be achieved that the reduced longitudinal control intervention is comfortable for the driver and does not distract or alarm the driver of the transportation vehicle. At the same time, however, the reduced longitudinal control intervention can be made sufficiently strong that it is reliably recognized by the driver and can be interpreted or understood as an indication of the detected obstacle and the correspondingly required increased attention.

In a further disclosed embodiment, the driving assistance system is set up to monitor acceleration values of the transportation vehicle provided by an accelerometer and to automatically adjust or control the reduced longitudinal control intervention in such a way that there is a braking acceleration of the transportation vehicle not exceeding 1 m/s$^2$, in particular, a braking acceleration in the range of 0.3 m/s$^2$ to 1 m/s$^2$, during the reduced longitudinal control intervention. These acceleration values shall be understood to be in the direction of travel and in the sense of a deceleration or slowing of the transportation vehicle in the direction of travel. When expressed as an acceleration, the values mentioned can also be given a negative sign. To achieve or comply with the specified braking accelerations or braking acceleration values, various measures can be applied, and various influences can be taken into account. Thus, for example, depending on the current inclination of a section of the road being traversed by the transportation vehicle, switching the transportation vehicle to an overrun mode for braking the transportation vehicle with the specified braking acceleration values may be sufficient. If, on the other hand, for example, the transportation vehicle is moving downwards on a downhill slope, the driving assistance system may carry out or cause additional or alternative control of the braking system of the transportation vehicle to achieve the specified braking acceleration. In this case, the accelerometer may be part of the driving assistance system. Similarly, however, the driving assistance system may, for example, comprise a data interface via which the acceleration values can be transmitted or received. By limiting the braking acceleration to the specified values during the reduced longitudinal control intervention, this can be made comfortable and thus alarming or distracting the driver of the transportation vehicle can be prevented, whereby the driver can be made aware of the respective situation, i.e., of the detected obstacle, particularly safely and comfortably. On the other hand, for emergency braking, for example, a braking acceleration of more than 4 m/s$^2$, for example, in the range of 5 m/s$^2$ to 6 m/s$^2$, may be provided to ensure that the transportation vehicle is brought to a standstill safely and as quickly as possible.

In a further disclosed embodiment, the driving assistance system is set up to bring about the reduced longitudinal control intervention only for a predetermined time period after the detection of the obstacle and to already terminate it before the transportation vehicle has approached the obstacle to such an extent that the collision with the obstacle can only be prevented by emergency braking. In other words, the reduced longitudinal control intervention is used here only as a relatively short-term, i.e., temporary, indication to the driver to draw attention to the situation or to the identified obstacle during the approach to the identified obstacle. The predetermined time period can be specified as an absolute value. The predetermined time period, i.e., a duration of the reduced longitudinal control intervention, may then—at least approximately—amount to 0.5 s, for example. Similarly, however, the given time period can be specified as a relative value or by a calculation rule. The actual time period or duration of the reduced longitudinal control intervention may then be further dynamically determined or specified by the driving assistance system in an individual case depending on, for example, a speed of the transportation vehicle, a distance between the transportation vehicle and the identified obstacle, an estimated or expected required stopping time of the transportation vehicle and/or the like, depending on a particular situation or environmental conditions. Due to the limited duration of the reduced longitudinal control intervention, the driver can be made aware of the situation and the speed of the transportation vehicle can still be reduced. However, after the reduced longitudinal control intervention has ended, the driver is able to use the full driving dynamics of the transportation vehicle to react to the situation, for example, to avoid the obstacle or to pass by the obstacle. The predetermined time period, i.e., the duration of the reduced longitudinal control intervention, can be selected or adjusted, for example, according to a typical reaction time of a driver. As a result, conflicts between a control intervention carried out manually by the driver for driving the transportation vehicle and the automatically performed or controlled reduced longitudinal control intervention can then be avoided. The transportation vehicle then reacts in a manner that is customary for the driver or expected by the driver, which can also contribute to improved safety.

In a further disclosed embodiment, the driving assistance system is set up to recognize as the obstacle another road user located next to a lane being used by the transportation vehicle, and using the provided environment data to detect road equipment of a section of road that is currently being traversed, the driving assistance system is then further set up to cause the reduced longitudinal control intervention only if both the obstacle was detected and additionally a feature of the road equipment was identified that indicates stopping position for the transportation vehicle that is provided at least depending on the situation. Such a feature of the road equipment may be a light signal system, a crossing system, a diagonal marking and/or a traffic sign regulating the way forward. The fact that the feature of the road equipment indicates a stopping position for the transportation vehicle means that, at least in certain situations, it is in accordance with a road traffic code or in the interests of road safety provision for the transportation vehicle to stop at the stopping position, i.e., at or before the corresponding feature of the road equipment.

In this sense, it is provided, for example, that the transportation vehicle stops at a suitable stopping position in front of a light signal system if the light signal system is set to 'red' for the transportation vehicle. Accordingly, it is provided, for example, that the transportation vehicle stops in front of a pedestrian crossing (also: a zebra crossing) when there is a pedestrian on or approaching the pedestrian crossing. In the present case, it is therefore envisaged that the road user is, for example, a pedestrian or a cyclist who is located or is moving on a side space of the respective road adjacent to the lane being used, for example, on a walkway or pavement or a cycle path or similar. This road user may then at least potentially constitute an obstacle or a risk of collision for the transportation vehicle, since the road user may move on the lane, i.e., on a roadway being used by the transportation vehicle, in an unforeseen manner.

However, it is not practical for transportation vehicles to be decelerated or slowed down whenever a pedestrian or a cyclist is located or moving next to the lane, which is immediately understandable, particularly in an inner-city area. The present embodiment is based on the finding that other road users, such as pedestrians and cyclists, often have a lane or a roadway in an area or environment of a planned crossing or even cross at a point where the respective lanes or transportation vehicles entering the respective roadway should typically stop or regularly stop. This includes situations or areas in which there is no provision at the respective point for crossing the lane or the roadway, for example, by pedestrians. But also in areas around a crossing system it can often be observed in practice that pedestrians enter the respective lane or the respective roadway next to the area intended for crossing, for example, because it results in a shorter or more direct route for the individual. Similarly, in practice it is common that, for example, pedestrians or cyclists cross the road at a light signal system even if the light signal system indicates "red" for them, i.e., if crossing the road by the pedestrians or cyclists is not envisaged at the respective time.

Thus, while it can be considered to be legitimate that transportation vehicles can be brought to a standstill manually or under automatic control by the driving assistance system at the respective feature of the road equipment, this alone often cannot provide optimum safety for all the road users involved. The disclosed driving assistance system therefore provides for the reduced longitudinal control intervention to be carried out on approaching a corresponding feature of the road equipment at least if there are other road users, in particular, a pedestrian, a cyclist or a user of any other small vehicle, sports equipment or the like in an environment of the respective feature. This is provided for if, in the particular situation, the transportation vehicle would not be obliged to stop anyway in accordance with the road traffic code, for example, because a light signal system for the transportation vehicle is set to 'green'. Due to the described often observed behavior of other road users in the area of corresponding features of the road equipment, the disclosed driving assistance system can however, in appropriate areas or situations, contribute particularly effectively to the improvement of road safety without unduly impairing the comfort of the driver of the transportation vehicle or a traffic flow along the respective section of road. Taking into account the described combination of conditions for causing longitudinal control intervention thus represents an optimal compromise with respect to safety, comfort and traffic efficiency.

In a further disclosed embodiment, the driving assistance system is set up to recognize as the obstacle a feature of a road equipment of a section of road currently being traversed, which is an envisaged stopping position for the transportation vehicle, at least depending on the situation. Furthermore, the driving assistance system is then set up to detect, on the basis of the environment data, whether there is another road user, in particular, a pedestrian, a cyclist or a user of a small vehicle or sports equipment, in the vicinity of the detected feature of the road equipment. Such a feature may be a light signal system, a crossing system, a diagonal marking and/or a traffic sign that regulates the way forward. This feature may be the feature already mentioned elsewhere in the present case. Furthermore, the driving assistance system is then set up to adjust a time profile, i.e., a profile or a graph of a strength, of a deceleration of the transportation vehicle caused by the driving assistance system during the approach of the transportation vehicle towards the identified feature of road equipment depending on the respective detection result. The driving assistance system thus adjusts the deceleration, which may be or may include the reduced longitudinal control intervention, depending on whether or not another corresponding road user has been detected or recognized in the area, i.e., on the feature or in an environment of the feature.

For this purpose, the driving assistance system automatically sets a progressive profile for the deceleration if another road user has been detected. If, on the other hand, no other road user has been detected, the driving assistance system automatically sets a decreasing profile for the deceleration. In other words, an approach behavior of the transportation vehicle to the recognized feature is adjusted or adapted depending on the situation. For example, the detected feature may be a traffic light indicating "red" for the transportation vehicle. If the transportation vehicle or the driving assistance system does not detect other road users, in particular, pedestrians or cyclists, in the vicinity of the traffic lights, the transportation vehicle may automatically be decelerated in accordance with the progressive profile at first, i.e., with the relatively lower deceleration, and is then automatically decelerated on further approaching the feature with an increasing braking acceleration, i.e., that is growing in strength. This allows a traffic area ahead of the corresponding feature of road equipment to be filled particularly quickly and efficiently, for example, by the transportation vehicle itself and other following transportation vehicles. If, on the other hand, a corresponding other road user has been detected in the vicinity of the traffic lights, the transportation vehicle can automatically be decelerated according to the depressive profile with an initially larger braking acceleration and then on further approaching the feature can be automatically decelerated with a decreasing braking acceleration. This allows the other road user to be signaled particularly early and unambiguously that the transportation vehicle or the driving assistance system has detected him and has correctly detected and classified the respective situation and that the situation is being controlled accordingly. This can benefit both safety and comfort of the other road users, as well as a flow of traffic in the area of the respective feature of road equipment.

In a further disclosed embodiment, the driving assistance system is set up to issue a takeover request to take control of the transportation vehicle to the driver of the transportation vehicle when carrying out the reduced longitudinal control intervention. In other words, the driver is advised to take over manual control of the transportation vehicle. If the driving assistance system does not allow the takeover or cannot take over fully automated and autonomous driving operations of the transportation vehicle, an optimal compromise between comfort and safety is achieved in this way. For example, the transportation vehicle's driving assistance system or another driving assistance system can take over the longitudinal control of the transportation vehicle for as long as, or in areas in which, no obstacles are detected, for example. If, on the other hand, an obstacle is detected, safety is already improved by the reduced longitudinal control intervention or a safer starting situation is created for subsequent reactions or interventions. In addition, due to the takeover request it can be particularly reliably achieved that the driver takes over manual supervision or control of the transportation vehicle in corresponding situations in which an actual or potential obstacle has been recognized, which can mean improved safety in the management of the transportation vehicle, at least according to the current state of the art. The first functionality of the driving assistance system can remain operational.

The takeover request can be issued or designed, for example, as a visual, acoustic and/or haptic indication or as a corresponding signal. The takeover request may be, for example, a displayed symbol, a signal or warning tone, a speech output and/or a vibration generated by an appropriate actuator and/or the like. The present combinations of the reduced longitudinal control intervention and the takeover request thus envisaged are particularly beneficial, since thus at least two separate and different effects or events result, that can alert the driver to the recognized obstacle, so that it can be particularly reliably achieved that the driver actually becomes aware of the recognized obstacle or the corresponding situation. In addition, the reduced longitudinal control intervention provides the driver with sufficient reaction time to detect the situation when the request for takeover occurs and to take control of the transportation vehicle and then still have enough time to react according to the situation, since the reduced longitudinal control intervention can prolong a time until a possible collision with the recognized obstacle will occur.

To carry out the described measures or processes, regardless of its specific embodiment, the disclosed driving assistance system may comprise a computer-readable data memory and a processor device connected thereto, for example, a microchip, a microprocessor or a microcontroller. A computer program or program code, which encodes or represents the described actions of the processes, can then be stored in the computer-readable data memory under storage medium. When this computer program or program code is executed by the processor device, the processor device or the driving assistance system is then caused to initiate or execute the described measures or processes.

Another disclosed embodiment of the present disclosure is a transportation vehicle that comprises an environment sensor system for the acquisition of environment data that characterize a respective current environment of the transportation vehicle. The disclosed transportation vehicle also comprises a disclosed driving assistance system coupled to the environment sensor system. The disclosed transportation vehicle may therefore be the transportation vehicle referred to in connection with the disclosed driving assistance system. Accordingly, the disclosed transportation vehicle may have the properties and/or parts or components mentioned in connection with the disclosed driving assistance system.

Another disclosed embodiment of the present disclosure is a method for operating a driving assistance system for a transportation vehicle and/or for operating a transportation vehicle with a driving assistance system. The driving assistance system is used to support a driver of the transportation vehicle during longitudinal control of the transportation vehicle. With the disclosed method it is provided that environment data, which characterize a respective current environment of the transportation vehicle, are recorded and provided or transmitted to the driving assistance system. In a further operation of the disclosed method, the environment data are processed by the driving assistance system for detecting an obstacle located ahead of the transportation vehicle in the direction of travel. With the disclosed method it is then further provided that the driving assistance system causes a longitudinal control intervention that is reduced in relation to an emergency braking intervention to slow down the transportation vehicle once the obstacle has been detected and before the transportation vehicle has approached the obstacle to such an extent that a collision with the obstacle can only be prevented by emergency braking. In other words, the disclosed method is used for operating a disclosed driving assistance system and/or for operating a disclosed transportation vehicle. The disclosed method may therefore include the measures, processes or procedures described in connection with the disclosed driving assistance system. This also includes such processes or procedures that are not explicitly described here in connection with the disclosed method or explicitly as part of the disclosed method. The computer program or the program code stored in the computer-readable data memory mentioned in connection with the disclosed driving assistance system, may encode or represent the disclosed method or the operations of the disclosed method. The execution of the computer program or program code may bring about or cause the automatic performance of the disclosed method.

The disclosure also includes developments of the disclosed transportation vehicle and the disclosed method, which have features as described in connection with the developments of the disclosed driving assistance system and vice versa. To avoid unnecessary redundancy, the corresponding developments are not described here separately for all these embodiments of the present disclosure.

In an exemplary embodiment, the described components of the embodiment each represent individual features that are to be regarded as mutually independent, which also further develop the disclosed embodiments independently of each other and thus must also be regarded as part of the disclosure individually or in combinations other than the combination shown. Furthermore, the described embodiment can also be supplemented by further features of the disclosure that have already been described.

Figure 1:
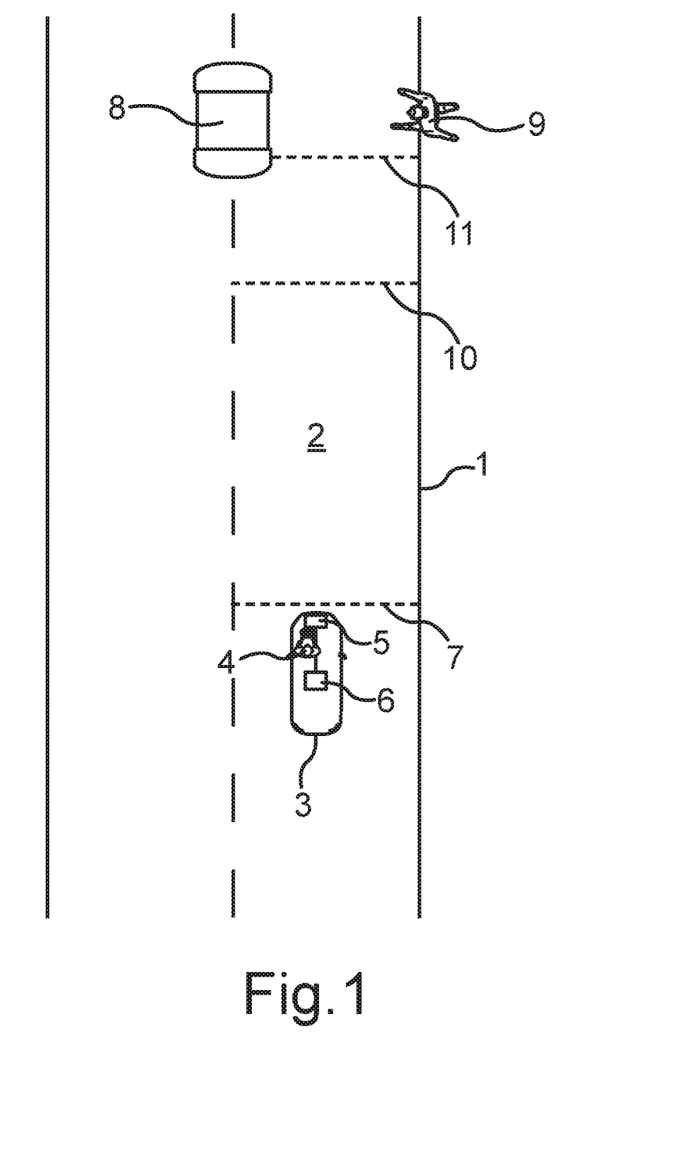
FIG. 1 shows a schematic top view of a traffic scene in which a transportation vehicle equipped with a driving assistance system is driving on a road.

FIG. 1 shows a schematic plan view of a traffic scene with a section of a road 1. A transportation vehicle 3 that is controlled by a driver 4 is moving on a lane 2 of road 1. The transportation vehicle 3 comprises an environment sensor arrangement 5 that collects environment data that characterize an environment of the transportation vehicle 3, here the traffic scenes shown. Furthermore, the transportation vehicle 3 comprises a driving assistance system 6, which supports the driver 4 based on the environment data provided by the environment sensor arrangement 5 during longitudinal control of the transportation vehicle 3.

In the traffic scene shown here, the transportation vehicle 3 is at a current position 7 and is moving forwards in the direction of travel towards a traffic island 8. In the present case, there is a pedestrian 9 in the vicinity of the traffic island 8. Schematically indicated here is an emergency braking position 10 which is the latest point at which the transportation vehicle 3 must start to brake with maximum deceleration or braking power by an emergency braking intervention to come to a standstill at a planned safe stopping position 11, which is also indicated schematically here, to avoid a collision with the pedestrian 9.

Figure 2:
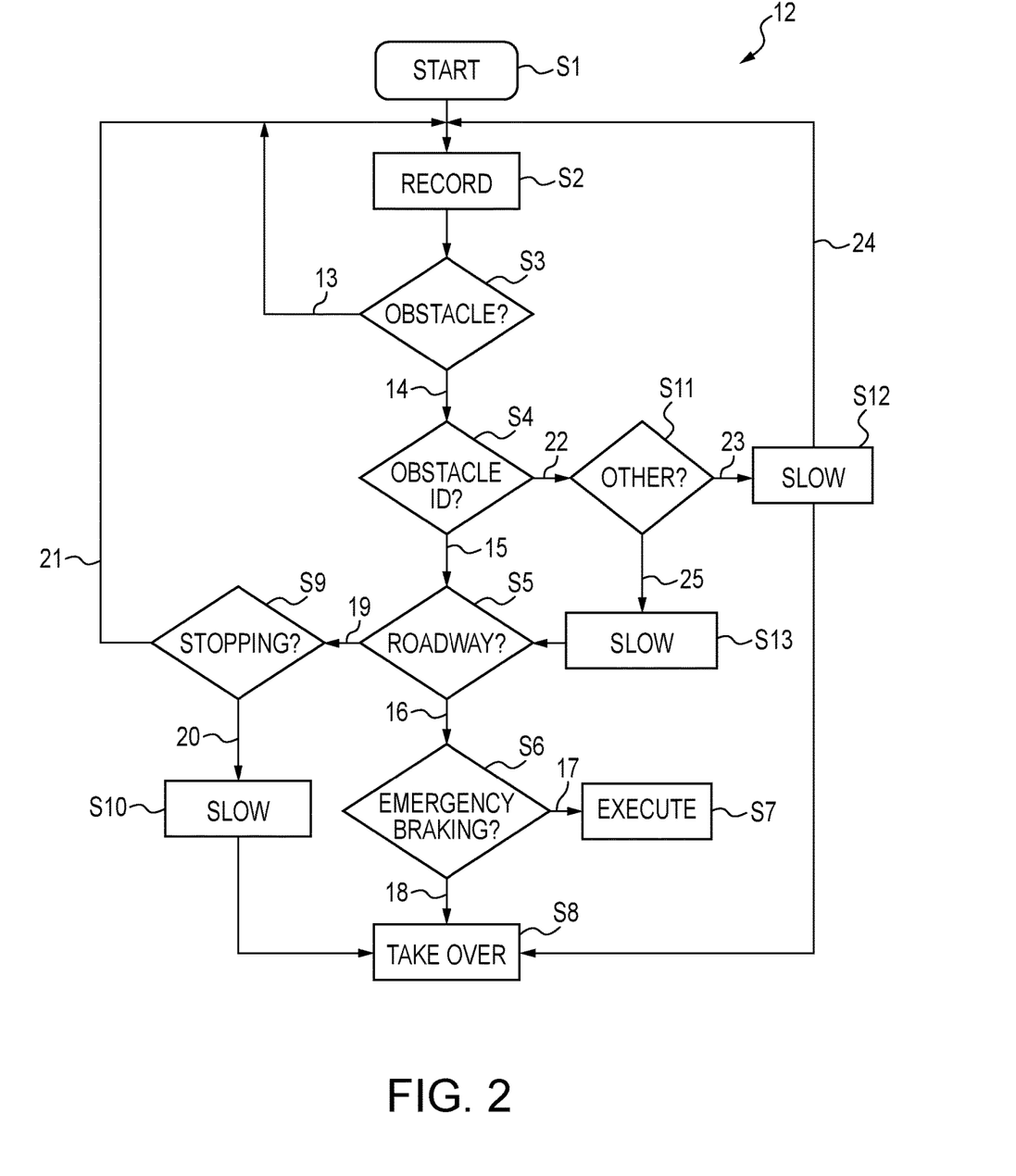
FIG. 2 shows an exemplary schematic flow chart of a method for operating a driving assistance system of a transportation vehicle.

FIG. 2 shows an exemplary schematic flow chart 12 of a method for operating the driving assistance system 6 or the transportation vehicle 3. The operations of the method are explained below with reference to FIG. 1. The operations of the method and their linking can be understood as blocks, program functions or program modules of a corresponding computer program that implements the procedure. However, an actual implementation may differ from the schema or flow chart 12, which is presented here only by way of example.

The method starts in an operation of the method or a program operation at S1. Here, for example, the transportation vehicle 3 can be started or the driving assistance system 6 can be put into operation.

In a program operation at S2, the environment data are recorded by the environment sensor arrangement 5 and transmitted to the driving assistance system 6. In the present case, the environment sensor arrangement includes a camera, which records and maps the traffic scene shown in FIG. 1, so that the environment data represent at least the lane 2 ahead of the transportation vehicle 3 in the direction of travel, the traffic island 8 and the pedestrian 9.

In a program operation at S3, the environment data are processed by the driving assistance system 6 and it is detected or determined whether there is an obstacle ahead of the transportation vehicle 3 in the direction of travel. If this is not the case, for example, because a distance of transportation vehicle 3 from the traffic island 8 and the pedestrian 9 is even greater than a range of the environment sensor 5, the method follows a loop-shaped path 13. The environment data are therefore collected and processed continuously.

If, on the other hand, an obstacle is detected in operation at S3 of the method, the method follows a program path 14 to a program operation at S4.

In program operation at S4, the obstacle is classified or identified. In the present case, the obstacle is identified as the pedestrian 9, after which the method follows a program path 15 to a program operation at S5.

In program operation at S5, the driving assistance system determines whether the detected pedestrian 9 is on a roadway, i.e., on the lane 2 being used by the transportation vehicle 3. If this is the case, the method follows a program path 16 to program operation at S6.

In program operation at S6, the driving assistance system determines whether the transportation vehicle 3 at the current position 7 has already approached the detected obstacle to such an extent that an emergency braking intervention with maximum deceleration is necessary to prevent or mitigate a collision with the identified obstacle. In other words, it is determined whether the transportation vehicle is already at the emergency braking position 10 or has even exceeded it. If this is the case, the method follows a program path 17 to program operation at S7, in which the driving assistance system 6 initiates the emergency braking intervention. If, on the other hand, at the current position 7 the transportation vehicle 3 is even further away from the detected obstacle, so that the emergency braking intervention is not yet necessary, the method follows a program path 18 from program operation at S6 to program operation at S8, in which a longitudinal control intervention that is reduced compared to the emergency braking intervention is initiated by the driving assistance system 6. At the same time, in operation at S8 of the method, a takeover request can be issued to the driver 4 to ask the driver to take over manual control or supervision of the transportation vehicle 3.

If, on the other hand, in program operation at S5 it was determined that the detected obstacle, i.e., the pedestrian 9, is next to the lane 2, for example, on a walkway, the method follows a program path 19 to program operation at S9.

In program operation at S9, on the basis of the environment data the driving assistance system 6 determines whether a feature of a road equipment can be detected that at least provides for or indicates stopping the transportation vehicle 3 depending on the situation. In the present case, the traffic island 8 is detected as such a feature, in front of which stopping the transportation vehicle 3 is provided at the stopping position 7 if the pedestrian 9 in the vicinity of the traffic island 8 wants to cross the lane 2 or the road 1. Since the traffic island 8 has been detected in the present case, the method follows a program path 20 to a program operation at S10, in which a decreasing profile for deceleration or slowing down is set by the driving assistance system 6. Subsequently in this case, program operation at S8, i.e., the reduced longitudinal control intervention, is also carried out, in this case with the set decreasing deceleration profile.

If, on the other hand, in a different situation or traffic scene the pedestrian 9 is next to lane 2 and no corresponding feature of the road equipment is detected, for example, if the traffic island 8 is not present, then the method follows a loop-shaped program path 21 starting from program operation at S9 to go through the method again as long as the transportation vehicle 3 or the driving assistance system 6 is in operation.

If in program operation at S4 the obstacle has been identified as a feature of the road equipment that provides for stopping the transportation vehicle at least depending on the situation, the method follows a program path 22 to a program operation at S11.

In the present case, the traffic island 8 was identified as the obstacle. In program operation at S11, the driving assistance system 6 then checks whether there is another road user in the vicinity of the identified obstacle, in particular, a pedestrian 9 or a cyclist who is crossing or potentially wants to cross the road 1 in the vicinity of the detected characteristic, i.e., here at the traffic island 8.

If this is not the case, i.e., there is no other road user nearby, the method follows a program path 23 to a program operation at S12, in which the driving assistance system 6 sets a progressive profile for a deceleration or slowing down. However, since passing through an area or section of road with a corresponding feature of the road equipment can always pose a potential danger situation, program operation at S8 is carried out in this case too, i.e., the reduced longitudinal control intervention, in this case with the progressive deceleration profile. This may be the case if the detected feature of road equipment provides for an actual stop of the transportation vehicle 3 in the respective situation, for example, if the feature is a light signal standing on "red". If in the respective situation no stopping of the transportation vehicle 3 is provided, alternatively a program path 24 following the execution of the reduced longitudinal control intervention can be dispensed with.

If, on the other hand, program operation at S11 determines that there is another road user in the vicinity or environment of the detected obstacle, the method follows a program path 25 starting from program operation at S11 to program operation at S13. In program operation at S13—as in program operation at S10—a progressive profile for the deceleration or slowing of the transportation vehicle 3 is set by the driving assistance system 6. The method is then continued as described with program operation at S5.

The driving assistance system 6 thus offers a predictive comfort intervention in accordance with the described method, for example, in the case of a pedestrian 9 that is crossing. If such a pedestrian 9 that is crossing is detected by the transportation vehicle or environment sensor arrangement 5 and the driving assistance system 6, the driving assistance system 6 reacts with such a predictive comfort intervention, i.e., with the reduced longitudinal control intervention. For this purpose, for example, a change of the transportation vehicle 3 into an overrun mode can be carried out, i.e., initiated by the driving assistance system 6. A resulting speed response may contribute to a de-escalation of the respective situation, direct the driver's attention and give the driver 4 an impression of the understanding of the situation by the driving assistance system 6.

It is provided here that, according to at least one disclosed embodiment of the described method or the driving assistance system 6, an approach by the transportation vehicle 3 to a certain feature of road equipment is varied, for example, to a pedestrian crossing with a light signal system. For example, the driving assistance system 6 is set up to slow down or stop the transportation vehicle 3 with a progressive deceleration at a red traffic light, which signals a stop to the transportation vehicle 3, if no pedestrian is detected in the surroundings of the traffic light. If, on the other hand, the pedestrian 9 is detected, a deceleration of the transportation vehicle 3 in accordance with the decreasing profile can be initiated at an early stage to signal to both the driver 4 and the detected pedestrian 9 that the respective situation has been correctly detected and is being controlled by the driving assistance system 6 or the transportation vehicle 3.

Overall, the examples described show how road safety can be enhanced in a particularly comfortable way.

REFERENCE CHARACTER LIST

1 Road
2 Lane
3 Transportation vehicle
4 Driver
5 Environment sensor arrangement
6 Driving assistance system
7 Current position (of the transportation vehicle 3)
8 Traffic island
9 Pedestrian
10 Emergency braking position
11 Stopping position
12 Flow chart
13-25 Program Paths
S1-S13 Program operation

The invention claimed is:

1. A driving assistance system for a transportation vehicle for assisting a driver of the transportation vehicle during longitudinal control of the transportation vehicle, wherein the driving assistance system:
   identifies an obstacle ahead of the transportation vehicle in the direction of travel based on environment data provided by an environment sensor arrangement, and
   initiates emergency braking intervention in accordance with a first functionality to bring the transportation vehicle to a standstill to avoid an imminent collision with the detected obstacle,
   wherein the driving assistance system causes, in accordance with a second functionality, a longitudinal control intervention that is reduced relative to the emergency braking intervention to slow the transportation vehicle down once the obstacle is detected and before the transportation vehicle approaches the obstacle to such an extent that the collision is only prevented by the emergency braking intervention,
   wherein the driving assistance system brings about the reduced longitudinal control intervention only for a specified time period after the obstacle has been detected to draw the attention of the driver, and ends the reduced longitudinal control intervention before the transportation vehicle approaches the obstacle to such an extent that the collision is only prevented by emergency braking.

2. The driving assistance system of claim 1, wherein the driving assistance system causes switching of the transportation vehicle into an overrun mode as the reduced longitudinal control intervention to utilize an engine braking effect to slow the transportation vehicle down.

3. The driving assistance system of claim 1, wherein the driving assistance system uses not more than 25% of a maximum braking power of the transportation vehicle for the reduced longitudinal control intervention.

4. The driving assistance system of claim 1, wherein the driving assistance system monitors the acceleration values of the transportation vehicle provided by an accelerometer and automatically controls the reduced longitudinal control intervention so that there is a braking acceleration of the transportation vehicle of not more than 1 m/s$^2$.

5. The driving assistance system of claim 1, wherein the driving assistance system detects another road user that is next to a lane that is being traversed by the transportation vehicles as the obstacle and detects a road equipment of a section of road that is currently being traversed based on the provided environment data, and initiates the reduced longitudinal control intervention only in response to both the obstacle being detected and an additional feature of the road equipment being identified that indicates a designated stopping position for the transportation vehicle.

6. The driving assistance system of claim 1, wherein the driving assistance system recognizes as the obstacle a feature of a road equipment of a section of road that is currently being traversed that indicates a designated stopping position for the transportation vehicle and detects whether there is another road user in the vicinity of the recognized feature of the road equipment based on the environment data, and adapts a time profile of a deceleration of the transportation vehicle caused by the driving assistance system during an approach to the feature of the road equipment based on the respective detection result, and sets a progressive profile of the deceleration in response to no other road users being detected and sets a decreasing profile of the deceleration in response to other road users being detected.

7. The driving assistance system of claim 1, wherein the driving assistance system issues a takeover request to the driver for the supervision of the transportation vehicle in response to the reduced longitudinal control intervention being carried out.

8. A transportation vehicle, comprising:
   an environment sensor arrangement for the acquisition of environment data that characterize a current environment of the transportation vehicle, and
   the driving assistance system of claim 1 coupled to the environment sensor.

9. A method for operating a driving assistance system for a transportation vehicle and/or for operating a transportation vehicle with a driving assistance system, the method comprising:
   acquiring environment data that characterize a current environment of the transportation vehicle, and providing the environment data to the driving assistance system; and
   processing the environment data by the driving assistance system to detect an obstacle ahead of the transportation vehicle in the direction of travel,
   wherein causing a longitudinal control intervention that is reduced in relation to the emergency braking effect to slow the transportation vehicle down by way of the driving assistance system once the obstacle is detected and before the transportation vehicle has approached the obstacle to such an extent that a collision of the transportation vehicle with the obstacle is only prevented by emergency braking,
   wherein the driving assistance system brings about the reduced longitudinal control intervention only for a specified time period after the obstacle has been detected to draw the attention of the driver, and ends the reduced longitudinal control intervention before the transportation vehicle approaches the obstacle to such an extent that the collision is only prevented by emergency braking.

10. The method of claim 9, wherein the driving assistance system causes switching of the transportation vehicle into an overrun mode as the reduced longitudinal control intervention to utilize an engine braking effect to slow the transportation vehicle down.

11. The method of claim 9, wherein the driving assistance system uses not more than 25% of a maximum braking power of the transportation vehicle for the reduced longitudinal control intervention.

12. The method of claim 9, wherein the driving assistance system monitors the acceleration values of the transportation vehicle provided by an accelerometer and automatically controls the reduced longitudinal control intervention so that there is a braking acceleration of the transportation vehicle of not more than 1 $m/s^2$.

13. The method of claim 9, wherein the driving assistance system detects another road user that is next to a lane that is being traversed by the transportation vehicles as the obstacle and detects a road equipment of a section of road that is currently being traversed based on the provided environment data, and initiates the reduced longitudinal control intervention only in response to both the obstacle being detected and an additional feature of the road equipment being identified that indicates a designated stopping position for the transportation vehicle.

14. The method of claim 9, wherein the driving assistance system recognizes as the obstacle a feature of a road equipment of a section of road that is currently being traversed that indicates a designated stopping position for the transportation vehicle and detects whether there is another road user in the vicinity of the recognized feature of the road equipment based on the environment data, and adapts a time profile of a deceleration of the transportation vehicle caused by the driving assistance system during an approach to the feature of the road equipment based on the respective detection result, and sets a progressive profile of the deceleration in response to no other road users being detected and sets a decreasing profile of the deceleration in response to other road users being detected.

15. The method of claim 9, wherein the driving assistance system issues a takeover request to the driver for the supervision of the transportation vehicle in response to the reduced longitudinal control intervention being carried out.

\* \* \* \* \*